Patented Sept. 24, 1929

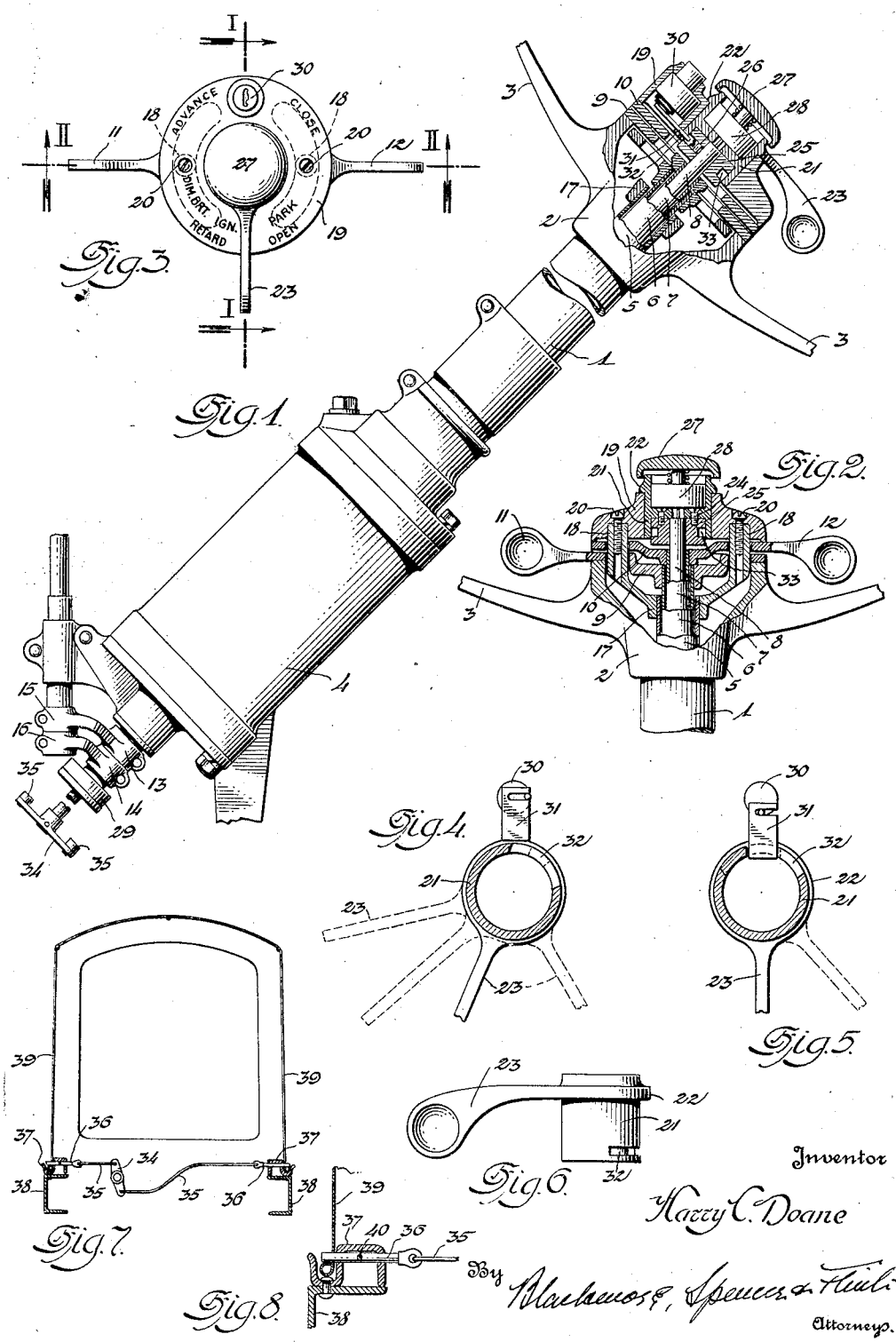

1,729,373

UNITED STATES PATENT OFFICE

HARRY C. DOANE, OF FLINT, MICHIGAN, ASSIGNOR TO GENERAL MOTORS CORPORATION, OF DETROIT, MICHIGAN, A CORPORATION OF DELAWARE

STEERING-COLUMN COMBINATION LIGHTING AND IGNITION SWITCH CONTROL

Application filed October 8, 1926. Serial No. 140,276.

This invention relates to anti-theft devices and more particularly to a lock to prevent unauthorized operation of an automobile engine.

One of the objects of the invention is to provide a multiple switch located at or near the base of the steering column and beneath the engine hood, for the lighting and ignition systems, the control lever for the switch being located at the top of the steering column, within convenient and easy reach of the driver.

Another object is to provide a lock mechanism at the top of the steering wheel which when locked, prevents the operation of the switch control lever to close the ignition circuit, but permits a lighting circuit to be closed for parking light purposes.

Another object is to so construct the lock mechanism that dismantling of the steering column top and tampering with the control mechanism is impossible.

A further and important object of the invention is to provide an engine hood lock controlled by the switch lever, so that when the lever is locked the hood cannot be raised or removed for access to the engine parts or the switch box.

Other objects and advantages will appear from the following specification and the accompanying drawing, illustrating a preferred embodiment of the invention, wherein Figure 1 is a fragmentary elevation partly in section of a steering column embodying the present invention and taken on line 1—1 of Figure 3.

Figure 2 is a cross section of the top of the steering column, taken at right angles to Figure 1, on line 2—2 of Figure 3.

Figure 3 is a plan view of the steering column top, showing the range thru which the mechanism may be employed.

Figures 4 and 5 are somewhat diagrammatic views, illustrating the range of control lever movement in unlocked and locked positions respectively.

Figure 6 is a detail view of the control member.

Figure 7 is a section thru the engine hood, showing a form of hood lock.

Figure 8 is an enlarged detail sectional view of the hood locking construction shown in Figure 7.

Referring now to the drawing, the hollow steering column 1 has at its upper end the hub 2, with spider arms 3, to which the usual steering wheel is attached, and at its lower end is provided with the gear box 4. Coaxially arranged within the column 1 are a series of relatively movable nested tubes 5, 6, 7 and 8. Secured to the top of the tubes 6 and 7 are circular plates 9 and 10 respectively, each plate having a lateral arm or lever, indicated by characters 11 and 12, extending on opposite sides of the hub 2 and constituting the hand operated spark and throttle levers. Mounted on the lower ends of the spark and throttle tubes 6 and 7 are collars 13 and 14, carrying gear segments which mesh with corresponding gear segments on collars 15 and 16, to operate a second series of nested tubes leading from the steering column to the ignition and fuel systems in the usual manner. Fastened to the top of the fixed or stationary outer tube 5, is the collar 17, which has a pair of oppositely disposed upwardly extending circular lugs or studs 18, projecting thru semi-circular slots in plates 9 and 10 into circular holes in the bottom of a closure cap or cover 19 for the top of the steering column, the screws 20 holding the cover thereon. The semi-circular slots in plates 9 and 10, are clearly shown by the dotted lines in Figure 3, which also shows their range of adjustment, the words "Retard" and "Advance" applying to the spark lever and the words "Open" and "Close" to the throttle lever. Both levers are shown midway their extreme adjustment positions.

Revolvably located within a central circular opening in the closure cap 19, is the cylindrical member or sleeve 21 having an annular flange 22, bearing on the top of the cap 19, and a lateral finger or hand operated lever 23 extending therefrom. Screws 24 extending thru a medial wall of the sleeve 21, secure the sleeve to a collar 25 fastened, by set screw 26, to the top of the innermost tube 8. The horn button 27 surrounding the top of the sleeve, operates a switch within the box 28, located in the sleeve above the medial wall, and the wires leading from the switch to the horn pass thru the center of tube 8. The rotary movement of the sleeve, by shifting the handle or lever 23, thru an arc of about 90°, controls the various lighting and ignition circuits indicated on the top of the cap 19, as shown in Figure 3. The inner tube 8 transmits such control movement to the switch box 29 at the bottom of the steering column, housing a rotary multiple switch controlling the several circuits. In the vertical position of the switch lever, as shown in Figure 3, all the circuits are open. Turning the lever to the left or clockwise, closes the ignition circuit. If the engine is to be operated without road lights the lever is simply moved to "ignition" position. Should bright lights be desired, the lever is moved to "bright" position, when both the ignition and bright lighting circuits are closed, while a further movement to "dim" position closes the combined ignition and dim lighting circuits. However, when it is desired to simply park the automobile, without operating the engine, the switch is turned to the right or counter-clockwise to "park" position, which closes only the parking light circuit. Thus, the ignition circuit is closed in any adjusted position to the left, either singly or in combination with bright or dim lighting circuits as desired. The present invention contemplates locking the switch lever against movement to the left to prevent closing of the ignition circuit, without locking the movement to the right. Therefore, unauthorized operation of the engine is prevented by limiting the range of lever movement to preclude closing of the ignition circuit, without affecting the closing of the parking light circuit at any time. This is accomplished by housing a lock mechanism 30 in the cap, to operate a plunger or tongue 31 into or out of engagement with a relatively small circumferential slot 32 in the side of the sleeve 21 and an annular groove 33 in the collar 25, registering with the slot. The range of movement with the lever unlocked and locked is shown more or less diagrammatically in Figures 4 and 5 respectively. In the locked position of Figure 5, the tongue 31 projecting within the slot 32, holds the lever against movement to the left, but does not prevent the closing of the parking light circuit by lever movement to the right.

Even should the screws 20 be removed when the switch lever is locked, the bodily rotation of the cap 19 and sleeve 21 is prevented by the studs 18 projecting into the recesses in the cap bottom. The possibility of dismantling the top portion of the steering column for access to the innermost tube 8, is entirely obviated since the tongue 31 projects into the annular groove 33, and separation of the various parts cannot be accomplished.

In order to prevent access to the engine parts and particularly to the switch box 29, at the end of the steering column, or the tampering with current conducting wires leading to the switch to close the ignition circuit independent of the switch, it is proposed to lock the engine hood in its closed position and to control the hood locking device by the switch lever. To this end, the tube 8 projects beyond the switch box 29 and has keyed thereto a lever 34, connected by link rods 35—35 to push or pull, upon adjustment of the lever 23, a pair of fingers 36—36. Each finger 36 slides in a bracket 37, riveted to the longitudinal frame member 38, into and out of engagement with the holes in the respective sides 39 of the hood, and extending thru each finger is a pin 40 to prevent withdrawal of the finger from its bracket. So long as the switch lever 23 is in "off" position, the hood is held against lifting or removal, but upon turning the lever to the left the rotation of the tube 8 pulls the fingers out of engagement with the hood. It will be obvious, therefore, that when the movement of the switch lever to the left is limited by the lock mechanism, access to the parts beneath the hood cannot be had.

While the parts and their arrangement have been described more or less specifically, it is to be understood that the invention is not limited to the exact details shown, but that such modifications may be made as come within the scope of the appended claims.

Having described the invention, I claim:

1. A device of the character described, including a plurality of electric circuits including a multiple switch and a rotatable operating member therefor, control means common to all said circuits and means to limit the range of rotation of said operating member, prevent unauthorized manipulation of said control means to close certain of said plurality of circuits, without affecting the manipulation of said operating member to close the remainder of said circuits.

2. A device of the character described, including a plurality of electric circuits, a manually operable control element common to each of said circuits and rotatable to different extents to close the respective circuits, and means to limit the range of rotary movement of said control element to prevent unauthorized closing of certain circuits, without affecting all the circuits common thereto.

3. A device of the character described, including two electric circuits, a rotary control element movable to different positions to close the respective circuits, and means to limit the rotation of said element for locking one circuit against closing while permitting closing of the other circuit.

4. A device of the character described, including an ignition circuit and a lighting circuit, a control element movable in opposite directions to close the respective circuits and means to prevent the movement in one direction in the same plane to hold one of said circuits against unauthorized closing.

5. A device of the character described, including a plurality of electric circuits, a control element common to said circuits and adapted to close a certain circuit singly and another circuit either singly or in combination with others, and, means to lock said element against manipulation to close the latter circuit and its various combinations without affecting its manipulation to close the said certain circuit.

6. A device of the character described, including a plurality of electric circuits, consisting of an independent circuit and a series of circuits, one of which series is closable independently of or in combination with any other circuit of the series, a control element common to each circuit for closing the respective circuits, and means to prevent unauthorized manipulation of said common control element to close any circuit of said series and still permit the closing of said first mentioned independent circuit.

7. In combination, a steering column, a multiple switch governing a plurality of electric circuits carried by the lower end of the column, a manually operated control element for the switch carried at the top of the column, a connection between the switch and the control element housed within said column, and a lock adapted to limit the operation of said control element and prevent disassembly of the steering column for access to said connection, whereby unauthorized closing of certain particular circuits is prevented.

8. In combination, a steering column, a fixed tube arranged coaxially within the column a cover cap for the top of the column secured to the fixed tube and held against relative movement therewith, an ignition switch carried at the lower end of the column, a control element for the switch, a tube located within said fixed tube to transmit the movements of the control element to said switch, and a lock housed in said cap and adapted to prevent unauthorized movement of the control element and maintain the ignition circuit open.

9. In combination, a steering column, a rotary multiple switch governing a number of electric circuits and located at the bottom of the column, a closure cap for the top of the column, a manually operated rotary element in said cap, having a relatively small circumferential slot therein, a tube axially arranged within the column imparting the adjustment of said rotary element to said switch to control the closing of the various circuits, a lock carried by the cap and a tongue actuated by said lock for projection into said circumferential slot to limit the adjustment of said rotary element within the angle of the arc of said slot.

10. In combination, a steering column, a switch governing a plurality of circuits, and carried at the bottom of the column, a plurality of nested tubes housed within the column, the outer tube being a fixed stationary mounting tube, operating means at the top of the steering column for the respective inner nested tubes to control the relative rotation of said tubes, one of such nested tubes having an operative connection with said switch, a cover for the top of the steering column mounted on said fixed tube, a lock embodied in said cover adapted to limit the range of relative rotation of said switch control tube, whereby the circuit switch contacts outside the range of movement are held open against unauthorized closing.

11. In combination, a steering column, nested tubes housed within the column including a fixed stationary outer tube and an inner relatively rotatable tube, a cover for the top of the column having interlocking engagement with said fixed tube, a rotatable member carried by the cover and secured to said inner tube, an electric circuit control switch located at the bottom of the column and having operative connection with said inner tube, a lock housed in said cover, a tongue operated by said lock, to move into and out of engagement with a circumferential slot in said rotatable member, and adapted to prevent unauthorized rotation of said member to operate said switch, and separation of the interlocked engagement of the cover and fixed tube.

12. In combination, a steering column, a closure cap at the top of the column, a rotary multiple switch at the bottom of the column controlling a number of electric circuits, an axial inner tube within the column connected with the switch, a collar at the upper end of the tube having a circumferential groove therein, a manually operable sleeve secured to said collar and mounted in a central opening of the cap and having a relatively small circumferential slot registering with the circumferential groove in said collar, lock mechanism carried by the cap, and a tongue actuated by the lock for projection into both said slot and said groove to prevent disassembly of the parts forming the upper portion of the steering column and limit the adjustment of the sleeve within the arc of said slot to preclude the closing of corresponding electric circuits.

In testimony whereof I affix my signature.

HARRY C. DOANE.